US009835721B2

United States Patent
Minowa (10) Patent No.: US 9,835,721 B2
(45) Date of Patent: Dec. 5, 2017

(54) CLUTTER SUPPRESSING DEVICE AND RADAR APPARATUS PROVIDED WITH THE SAME

(71) Applicant: Furuno Electric Co., Ltd., Nishinomiya (JP)

(72) Inventor: Masahiro Minowa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 233 days.

(21) Appl. No.: 14/836,242

(22) Filed: Aug. 26, 2015

(65) Prior Publication Data

US 2016/0061945 A1    Mar. 3, 2016

(30) Foreign Application Priority Data

Aug. 29, 2014   (JP) ................................. 2014-174697

(51) Int. Cl.
*G01S 13/52* (2006.01)
*G01S 13/524* (2006.01)
(Continued)

(52) U.S. Cl.
CPC ............ *G01S 13/524* (2013.01); *G01S 7/414* (2013.01); *G01S 13/89* (2013.01); *G01S 13/95* (2013.01); *G01S 13/951* (2013.01); *G01S 7/023* (2013.01)

(58) Field of Classification Search
CPC .... G01S 13/524; G01S 7/2806; G01S 7/2923; G01S 13/951; G01S 13/538;
(Continued)

(56) References Cited

U.S. PATENT DOCUMENTS 5,451,961 A * 9/1995 Rubin ................... G01S 7/2923
  342/159
5,831,570 A * 11/1998 Ammar ................. F41G 7/2226
  342/149
(Continued)

FOREIGN PATENT DOCUMENTS

EP    0133002 A2 *  2/1985 ........... G01S 7/2923
EP    1172664 A2    1/2002
(Continued)

OTHER PUBLICATIONS

European Patent Office, Extended European Search Report Issued in Application No. 15182037.0, dated Jan. 25, 2016, Germany, 9 pages.

*Primary Examiner* — John B Sotomayor
(74) *Attorney, Agent, or Firm* — Alleman Hall Creasman & Tuttle LLP (57) ABSTRACT

A clutter suppressing device for suppressing echo data of static clutter components indicating reflection waves caused by radar transmission signals reflecting on a static object is provided. The device includes a static clutter component suppressor configured to receive reception signals containing the static clutter components, and suppress the static clutter components, a reference data memory configured to store, as reference data, echo data of the reception signals obtained in fine weather and in which the static clutter components are suppressed by the static clutter component suppressor, and a rain component extracting module configured to extract echo data indicating rain components contained in the reception signals, by removing the reference data stored in the reference data memory from echo data of the reception signals obtained in rainy weather and in which the static clutter components are suppressed by the static clutter component suppressor.

4 Claims, 6 Drawing Sheets

(51) Int. Cl.
*G01S 7/41* (2006.01)
*G01S 13/95* (2006.01)
*G01S 13/89* (2006.01)
*G01S 7/02* (2006.01)

(58) Field of Classification Search
CPC ........... G01S 2007/2886; G01S 13/956; G01S 13/89; G01S 13/95; G01S 7/414; G01S 7/023

See application file for complete search history.

(56) References Cited

U.S. PATENT DOCUMENTS

| | | | |
|---|---|---|---|
| 7,064,704 B2* | 6/2006 | Bergkvist | G01S 13/22 342/118 |
| 7,307,577 B1* | 12/2007 | Kronfeld | G01S 7/411 342/118 |
| 8,159,369 B1* | 4/2012 | Koenigs | G01S 7/062 340/963 |
| 8,902,100 B1* | 12/2014 | Woodell | G01S 7/04 324/74 |
| 2012/0249365 A1* | 10/2012 | Christianson | G01S 13/953 342/26 B |
| 2013/0241766 A1* | 9/2013 | Kishigami | G01S 7/023 342/159 |
| 2013/0342382 A1 | 12/2013 | Maeno | |

FOREIGN PATENT DOCUMENTS

| | | | |
|---|---|---|---|
| EP | 1172664 A3 | 4/2003 | |
| JP | 2010185768 A | 8/2010 | |
| JP | 2011169829 A | 9/2011 | |
| JP | 2013224884 A | 10/2013 | |
| WO | WO 8601001 A1 * | 2/1986 | ........... G01S 7/2923 |
| WO | 9822834 A1 | 5/1998 | |

* cited by examiner

CLUTTER SUPPRESSING DEVICE AND RADAR APPARATUS PROVIDED WITH THE SAME

CROSS-REFERENCE TO RELATED APPLICATION(S)

This application claims priority under 35 U.S.C. §119 to Japanese Patent Application No. 2014-174697, which was filed on Aug. 29, 2014, the entire disclosure of which is hereby incorporated by reference.

TECHNICAL FIELD

This disclosure is related to a clutter suppressing device which suppresses static clutter components contained in a reception signal of a meteorological radar, and a radar apparatus provided with the clutter suppressing device.

BACKGROUND OF THE INVENTION

Generally, meteorological radars measure precipitation by transmitting radio waves over 360° around the radar concerned and receiving reflection wave (echo) signals caused by the transmitted radio waves reflecting on cloud or rain. The reflection wave signals contain not only echo components of cloud or rain that are observation targets, but also static clutter components that are unnecessary reflection wave components caused by the transmitted radio waves reflecting on static object(s) that is not the observation target. The static clutter components mainly contain ground clutter components that are reflection wave signal components of land.

Such static clutter components cause degradation in accuracy of rain amount calculation in meteorological observation. Therefore, conventional meteorological radars are provided with signal processing devices that perform Moving Target Indicator (MTI) processing so as to suppress such static clutter components (e.g., see JP2011-169829A).

The meteorological radar signal processing apparatus described in JP2011-169829A includes: an MTI processor that computes ground clutter components from the reception signals of a target-reflected wave, on the basis of the predetermined MTI parameters and removes them; a speed width filter that compares signals in which the ground clutter component is removed by the MTI processing with a threshold based on a predetermined speed width parameter, and extracts meteorological echo components included in the signals processed by the MTI processing; and a meteorological information computing section that obtains meteorological information from the output of the speed width filter.

By this configuration, with the apparatus described in JP2011-169829A, observation data and simulated weather echo at the radar installation point obtained in fine weather are used to automatically search optimal values of the MTI parameter and the speed width parameter, and the automatically searched MTI parameter and speed width parameter are set in the MTI processor and the speed width filter in advance, so that parameters can be automatically adjusted by simulation in an off-line mode.

However, with the apparatus described in JP2011-169829A, since the observation data in fine weather is used, it is difficult to improve the accuracy of rain amount calculation in meteorological observation.

Such a difficulty is caused due to echo components of a static object such as land or a building (especially echo components of land) significantly increasing in level and variation in fine weather compared to when raining, which leads to obtaining unstable observation data in fine weather. Thus, if the observation data in fine weather is used, the echo components of the static object are not suppressed enough and remain, or the echo components of the static object are overly suppressed which causes over-suppression of echo components of rain (rain components). As a result, with the apparatus described in JP2011-169829A, it is difficult to improve the accuracy of rain amount calculation in meteorological observation.

SUMMARY OF THE INVENTION

The purpose of this disclosure relates to providing a clutter suppressing device which can suitably suppress static clutter components, and a radar apparatus provided with the clutter suppressing device.

According to an aspect of this disclosure, a clutter suppressing device is provided. The clutter suppressing device suppresses echo data of static clutter components indicating reflection waves caused by radar transmission signals reflecting on a static object, each of the radar transmission signals transmitted at a predetermined azimuth at a predetermined time interval from a radar antenna provided at a predetermined observation location to observe meteorological weather. The clutter suppressing device includes a static clutter component suppressor, a reference data memory, and a rain component extracting module. The static clutter component suppressor receives reception signals containing the static clutter components, and suppresses the static clutter components. The reference data memory stores, as reference data, echo data of the reception signals obtained in fine weather and in which the static clutter components are suppressed by the static clutter component suppressor. The rain component extracting module extracts echo data indicating rain components contained in the reception signals, by removing the reference data stored in the reference data memory from echo data of the reception signals obtained in rainy weather and in which the static clutter components are suppressed by the static clutter component suppressor.

By this configuration, the rain component extracting module removes the reference data obtained in fine weather and generated by suppressing the echo data of the static clutter components, from the data obtained in rainy weather and in which the static clutter components are suppressed, and thus, the echo data of the static clutter components can suitably be suppressed.

The static clutter component suppressor preferably has the following configuration. The static clutter component suppressor includes an echo data memory configured to sequentially store a plurality of echo data of reflection waves caused by the radar transmission signals reflecting on objects, a filter configured to select, from the plurality of echo data stored in the echo data memory, a data row in the azimuth direction for a predetermined distance, and suppress, in the data row, echo data of a target object moving at a speed within a predetermined range including zero speed, and a suppression echo data output unit configured to output suppression echo data containing the echo data suppressed by the filter.

The static clutter component suppressor preferably has the following configuration. The static clutter component suppressor includes a suppression echo data memory configured to store the suppression echo data outputted from the suppression echo data output unit, a first weighting module configured to weight each data of the data row in the azimuth direction for the predetermined distance selected from the plurality of echo data stored in the echo data memory, and obtain a first sum value of the weighted data, a second weighting module configured to select, from the suppression echo data stored in the suppression echo data memory, a data row in the azimuth direction for the predetermined distance, weight each data of the data row, and obtain a second sum value of the weighted data, and a difference calculating module configured to obtain a difference between the first and second sum values, and cause the suppression echo data output unit to output the difference as the suppression echo data.

The reception signals received by the static clutter component suppressor are preferably signals containing the reflection waves from which interference components are removed.

According to another aspect of this disclosure, a radar apparatus is provided. The radar apparatus includes the clutter suppressing device described as above, a radar antenna configured to transmit each of the radar transmission signals at a predetermined azimuth from the radar antenna at a predetermined time interval, a transmitter configured to output the radar transmission signal to the radar antenna, and a receiver configured to receive the plurality of echo data of the reflection waves caused by the radar transmission signals reflecting on the objects.

According to this configuration, the radar apparatus includes the clutter suppressing device described as above, and thus, it can suppress the echo data of the static clutter components suitably.

According to this disclosure, the clutter suppressing device having the effect of suppressing the echo data of the static clutter components suitably, and the radar apparatus provided with the clutter suppressing device, can be provided.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, an embodiment of this disclosure is described with reference to the appended drawings. In the following embodiment, a clutter suppressing device according to this disclosure is applied to a meteorological radar as an example.

First, a configuration of the meteorological radar of this embodiment according to this disclosure is described.

Figure 1:
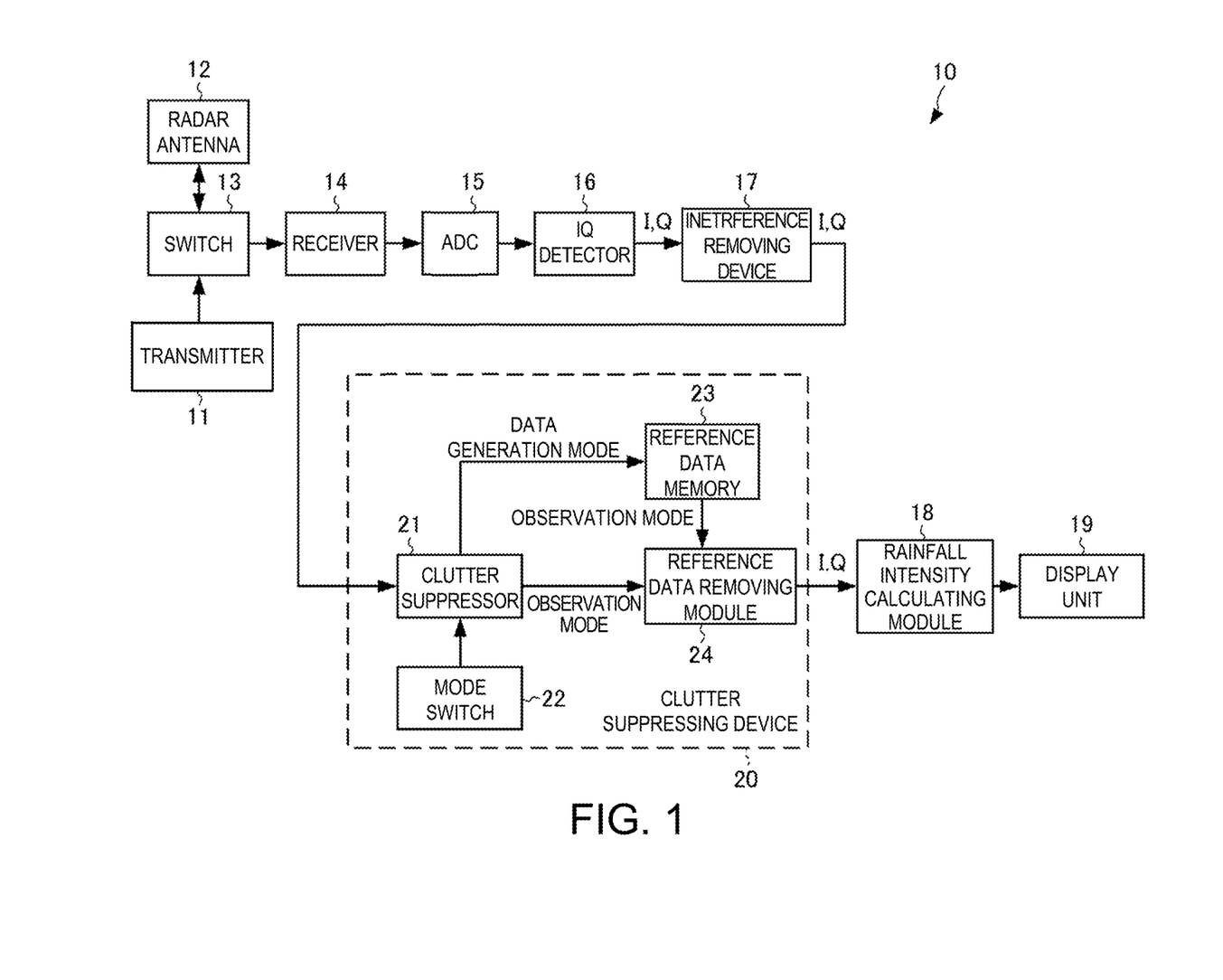
FIG. 1 is a block diagram of a radar apparatus of one embodiment according to this disclosure.

As illustrated in FIG. 1, a meteorological radar 10 of this embodiment includes a transmitter 11, a radar antenna 12, a switch 13, a receiver 14, an analog-to-digital converter (ADC) 15, an IQ detector 16, an interference removing device 17, a clutter suppressing device 20, a rainfall intensity calculating module 18, and a display unit 19. This meteorological radar 10 is fixed at a predetermined observation location and observes rain and snow. The meteorological radar 10 may be referred to as the radar apparatus.

The meteorological radar 10 includes a microcomputer (not illustrated) comprised of a CPU, a ROM, a RAM, and an input/output circuit to which various interfaces are connected. The microcomputer achieves functions of the meteorological radar 10 by causing the CPU to execute control program(s) stored in the ROM.

The transmitter 11 includes a signal generator configured to generate a radar transmission signal and a frequency converter configured to convert a frequency of the generated radar transmission signal into a frequency within a predetermined frequency band. The transmitter 11 outputs the frequency-converted radar transmission signal to the radar antenna 12 via the switch 13.

While the radar antenna 12 horizontally rotates at a constant speed (e.g., one full rotation (360°) in 2.5 seconds), it discharges the radar transmission signal transmitted from the transmitter 11 at every predetermined rotational angle of the radar antenna 12 (every predetermined sweep) at a predetermined time cycle (e.g., every single millisecond), and the radar antenna 12 receives radar reception signals including, as object signal components, reception signals which are reflection waves caused by the radar transmission signals reflecting on object(s). A distance from the radar antenna 12 to the object is obtained based on a difference between a reception time point of the radar reception signal containing the object signal components and a transmission time point of the radar transmission signal corresponding to the radar reception signal. Further, an azimuth of the object is obtained based on the azimuth to which the radar antenna 12 is oriented when it transmits the radar transmission signal corresponding to the radar reception signal.

The switch 13 outputs the radar transmission signal generated by the transmitter 11 to the radar antenna 12 and outputs the radar reception signal received by the radar antenna 12 to the receiver 14, and switches its operation therebetween.

The receiver 14 includes a frequency converter configured to convert a frequency of the radar reception signal received via the switch 13, and outputs the frequency-converted radar reception signal to the ADC 15.

Here, the receiver 14 outputs per radar reception signal caused by a single transmission of the radar transmission signal, as echo data for one sweep. For example, in a case where the radar antenna 12 fully rotates once in six seconds and discharges the radar transmission signal 1,000 times in one second, the receiver 14 outputs echo data for 6,000 sweeps while the radar antenna 12 fully rotates once. Echo data for one sweep includes a plurality of echo data aligned in a distance direction (time axis) obtained by a single transmission of the radar transmission signal. In a case where the object is moving, the distance from the radar antenna 12 to the object changes and the echo data from the object changes in every sweep, which leads to a conclusion that the object has a moving speed.

The ADC 15 converts an analog-formatted medium frequency signal outputted from the receiver 14 into a digital signal, and outputs it to the IQ detector 16.

Based on the digital-formatted radar reception signal outputted from the ADC 15, the IQ detector 16 generates an I-phase component and a Q-phase component different from each other in phase by $\pi/2$, and outputs them to the interference removing device 17.

The interference removing device 17 removes an interference component contained in the radar reception signal. In a case where another radar apparatus exists around the meteorological radar 10, a radar wave from the other radar apparatus may be superimposed on the reflection wave to be received by the meteorological radar 10, and the interference component will be found in the reflection wave. Therefore, the interference removing device 17 is provided to remove such an interference component. The interference removing device 17 has a known configuration, for example, a configuration described in JP2011-252822A.

The clutter suppressing device 20 includes a clutter suppressor 21, a mode switch 22, a reference data memory 23, and a reference data removing module 24. The clutter suppressing device 20 suppresses the clutter components from the radar reception signal in terms of the I- and Q-phase components, and outputs the suppressed radar reception signal to the rainfall intensity calculating module 18.

The clutter suppressor 21 has a filter characteristic with sharp inclination and suppresses echo static clutter components. The configuration of the clutter suppressor 21 is described later in detail. Note that, the clutter suppressor 21 may be referred to as the static clutter component suppressor.

The mode switch 22 switches a mode of the clutter suppressor 21 between a data generation mode for generating reference data and an observation mode for observing the meteorological phenomena.

The reference data memory 23 stores, as reference data, echo data of the radar reception signals obtained in fine weather and in which the static clutter components are suppressed by the clutter suppressor 21.

The reference data removing module 24 extracts echo data indicating rain components contained in the radar reception signals, by removing the reference data stored in the reference data memory 23 (no rain component) from echo data of the radar reception signals obtained in rainy weather and in which the static clutter components are suppressed by the clutter suppressor 21 (containing rain components). The reference data removing module 24 may be referred to as the rain component extracting module. Note that, the definition of "rain" used herein includes snow, hail, etc.

The rainfall intensity calculating module 18 receives the echo data indicating the rain components from the clutter suppressing device 20 and calculates the rainfall intensity based on radar equation.

The display unit 19 is, for example, comprised of a liquid crystal display, and displays data of the rainfall intensity outputted from the rainfall intensity calculating module 18 in a distinctive manner by differentiating display color according to the rainfall intensity, for example.

Figure 2:
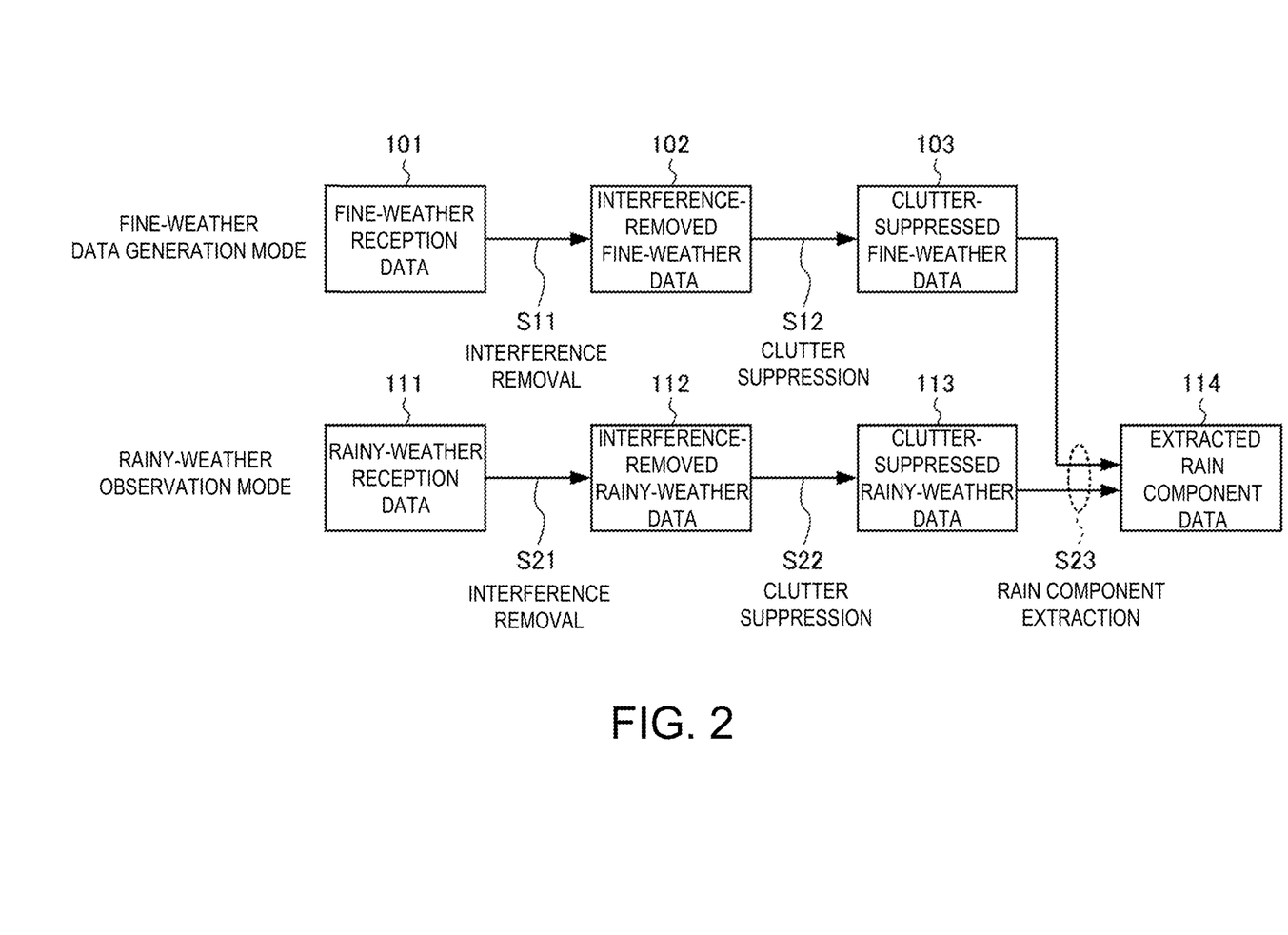
FIG. 2 is a view for describing operation of the radar apparatus of the embodiment according to this disclosure.

Next, operation of the meteorological radar 10 in this embodiment is described with reference to FIGS. 1 and 2.

First, the data generation mode applied in fine weather is described. The data generation mode is set by the mode switch 22.

By the operation from the transmitter 11 to the IQ detector 16, fine-weather reception data 101 is obtained. Note that, since the detailed operation from the transmitter 11 to the IQ detector 16 is known, the description thereof is omitted.

The interference removing device 17 removes the interference components from the fine-weather reception data 101 (S11), so as to obtain interference-removed fine-weather data 102 in which the interference components are removed from the fine-weather reception data 101.

The clutter suppressor 21 suppresses the static clutter components in the interference-removed fine-weather data 102 (S12), so as to obtain clutter-suppressed fine-weather data 103. The clutter-suppressed fine-weather data 103 contains static clutter components remaining after the clutter suppression, and is stored in the reference data memory 23 as the reference data.

Next, the observation mode applied in rainy weather is described. The observation mode is set by the mode switch 22.

By the operation from the transmitter 11 to the IQ detector 16, rainy-weather reception data 111 is obtained. Note that, since the detailed operation from the transmitter 11 to the IQ detector 16 is known, the description thereof is omitted.

The interference removing device 17 removes the interference components from the rainy-weather reception data 111 (S21), so as to obtain interference-removed rainy-weather data 112 in which the interference components are removed from the rainy-weather reception data 111.

The clutter suppressor 21 suppresses the static clutter components in the interference-removed rainy-weather data 112 (S22), so as to obtain clutter-suppressed rainy-weather data 113. The clutter-suppressed rainy-weather data 113 contains the static clutter components remaining after the clutter suppression, and the rain components.

The reference data removing module 24 extracts the data indicating the rain components by removing the clutter-suppressed fine-weather data 103 from the clutter-suppressed rainy-weather data 113 (S23), so as to obtain extracted rain component data 114 in which the static clutter components are sufficiently suppressed (removed). The extracted rain component data 114 is inputted into the rainfall intensity calculating module 18 for rainfall intensity calculation, and the data indicating the rainfall intensity is displayed on the display unit 19.

Next, the outline of the clutter suppressor 21 is described in comparison with a MTI processing device which performs conventional MTI processing, based on FIGS. 3A and 3B, and FIGS. 4A and 4B.

Figure 3A:
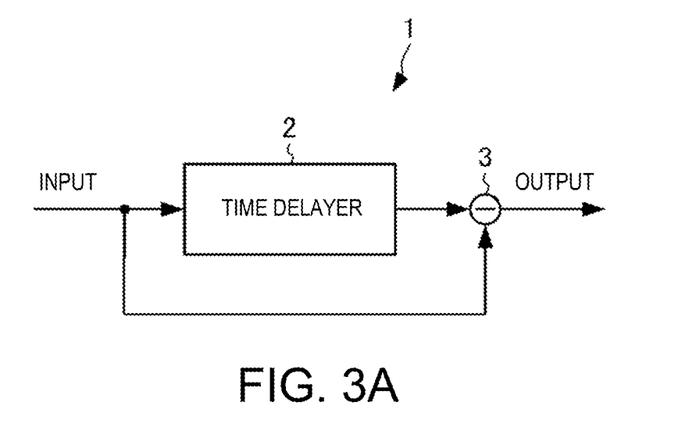
FIGS. 3A and 3B are views illustrating a conceptual configuration of a conventional MTI processing device and a filter characteristic thereof, respectively.

FIG. 3A illustrates a conceptual configuration of the conventional MTI processing device 1. The conventional MTI processing device 1 includes a time delayer 2 for delaying the input signal to be inputted in every sweep by a period of time corresponding to one sweep, and a subtractor 3 for calculating a difference in intensity between a latest input signal and an input signal of one sweep before the latest input signal.

Figure 3B:
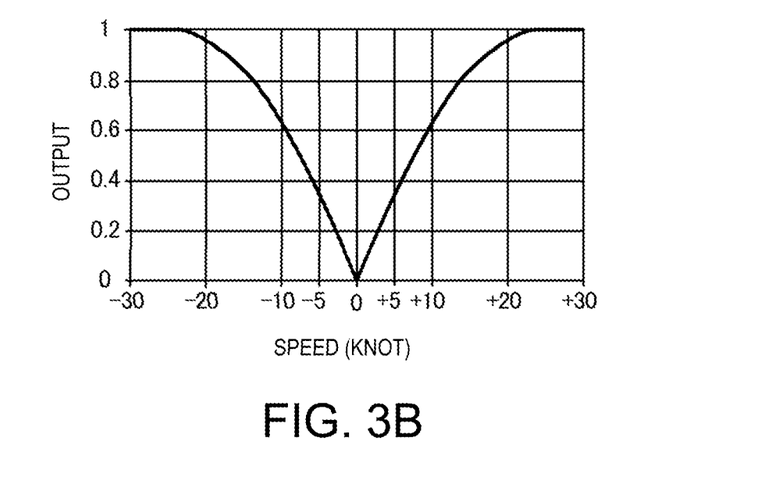

In order to find the cause of suppression on echo components of an object when static clutter components are suppressed by the conventional MTI processing device 1, the present inventors focused on filter characteristic with respect to a moving speed of the object indicated by echo data aligned in the sweep direction (azimuth direction), and obtained a filter characteristic of the conventional MTI processing device 1 illustrated in FIG. 3B. In FIG. 3B, the lateral axis indicates the speed of the object and the vertical axis indicates a standardized output. Note that, the positive (+) and negative (−) symbols for speed indicate whether the object is moving closer to (e.g., positive symbol) or father from (e.g., negative symbol) the meteorological radar 10.

As illustrated in FIG. 3B, in the filter characteristic of the conventional MTI processing device 1, the output level deteriorates comparatively greatly even when the speed of the object is 5 or 10 knots. This characteristic indicates that with the conventional MTI processing device 1, if the static clutter components around the speed of 0 knot are to be suppressed, the echo components of the object moving at the comparatively low speed (e.g., 5 or 10 knots) will also be suppressed. On the contrary, if the echo components of the object moving at the comparatively low speed (e.g., 5 or 10 knots) are to be avoided from being suppressed, the static clutter components around the speed of 0 knot will also not be suppressed.

Thus, through conducting studies on the improvement in filter characteristic over and over again, the present inventors invented the clutter suppressor 21 configured to sequentially receive the echo data for a plurality of sweeps, select, from echo data for the plurality of sweeps, a data row in the azimuth direction for a predetermined distance, and weight each data of the data row in real time. Thus, the present inventors obtained a configuration of designing a filter characteristic with sharp inclination to suppress the static clutter components.

Figure 4A:
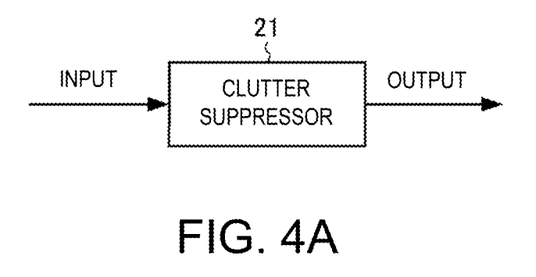
FIGS. 4A and 4B are views illustrating a conceptual configuration of a clutter suppressor provided to the radar apparatus according to this disclosure and a filter characteristic thereof, respectively.

A conceptual configuration of the clutter suppressor 21 is illustrated in FIG. 4A. The clutter suppressor 21 has a filter characteristic indicated by Equation 1. Due to having this filter characteristic, the clutter suppressor 21 functions as a kind of high-pass filter which allows the echo components of objects moving at a predetermined speed or higher to pass.

$$Y_i = \frac{1}{a_0}\left(\sum_{j=0}^{N_b-1} b_j X_{i-j} - \sum_{k=1}^{N_a-1} a_k Y_{i-k}\right) \quad (1)$$

Here, X indicates input data, and Y indicates a result of filtering the input data X. i indicates the number of the sweep data. $b_j$ indicates a coefficient to be weighted on the input data $X_{i-j}$, $N_b$ indicates the number of the coefficients, $a_k$ indicates an inverse coefficient to be weighted on output data $Y_{i-k}$, and $N_a$ indicates the number of the inverse coefficients. j and k indicate integers for specifying targets to be weighted, respectively.

In Equation 1, the filter characteristic is determined based on the coefficient $b_j$ and the inverse coefficient $a_k$. Since extremely complicated operations are required for obtaining the coefficient $b_j$ and the inverse coefficient $a_k$, it is preferred to obtain a desirable filter characteristic by using a designing tool of an Infinite Impulse Response (IIR) filter, for example.

Note that, this disclosure is not achieved by simply applying a general IIR filter. If simply applying a conventional IIR filter, the weighting is performed along the time axis, in other words, along the data in the distance direction contained in the echo data for one sweep. Whereas, the clutter suppressing device 20 is revised in that by weighting in real time each echo data of the data row in the azimuth direction for the predetermined distance selected from the echo data for the plurality of sweeps, the inclination in the filter characteristic is made sharp to suppress the static clutter components.

Figure 4B:
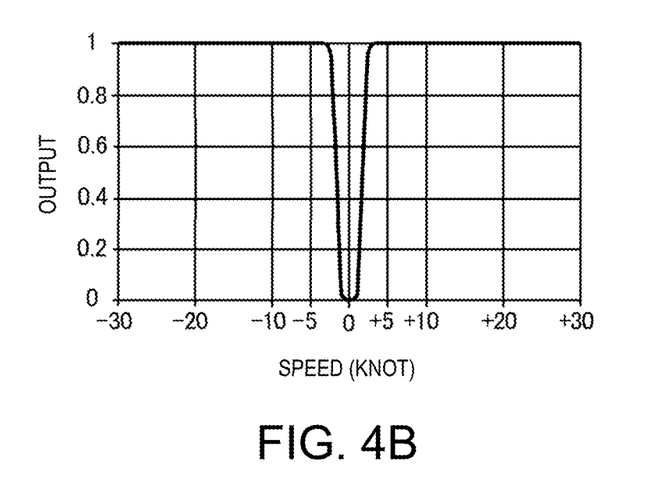

Specifically, the filter characteristic of the clutter suppressor 21 is illustrated in FIG. 4B. The filter characteristic in FIG. 4B is designed so as to suppress the echo components of a target object having a speed within a range of ±3 knots including 0 knot. As illustrated in FIG. 4B, the clutter suppressor 21 can suppress only the target object moving at the speed of around 0 knot. Thus, the suppression of only the static clutter components can be performed without suppressing the echo components of the object moving at the comparatively low speed (e.g., 5 or 10 knots). As a result, the meteorological radar 10 can improve the accuracy of the rain amount calculation in meteorological observation.

Note that, for example, the numbers of the coefficients $b_j$ and the inverse coefficients $a_k$ can arbitrarily be determined by taking the processing time period and the desirable filter characteristic into consideration. In this case, the number of memories on the input side and the number of memories on the output side for data are determined according to the numbers of the coefficients $b_j$ and the inverse coefficients $a_k$, respectively. Further, the filter characteristic of the clutter suppressor 21 may be designed based on a filter characteristic of a digital filter other than the IIR filter, for example a Finite Impulse Response (FIR) filter.

Next, a specific configuration of the clutter suppressor 21 is described with reference to FIG. 5.

Figure 5:
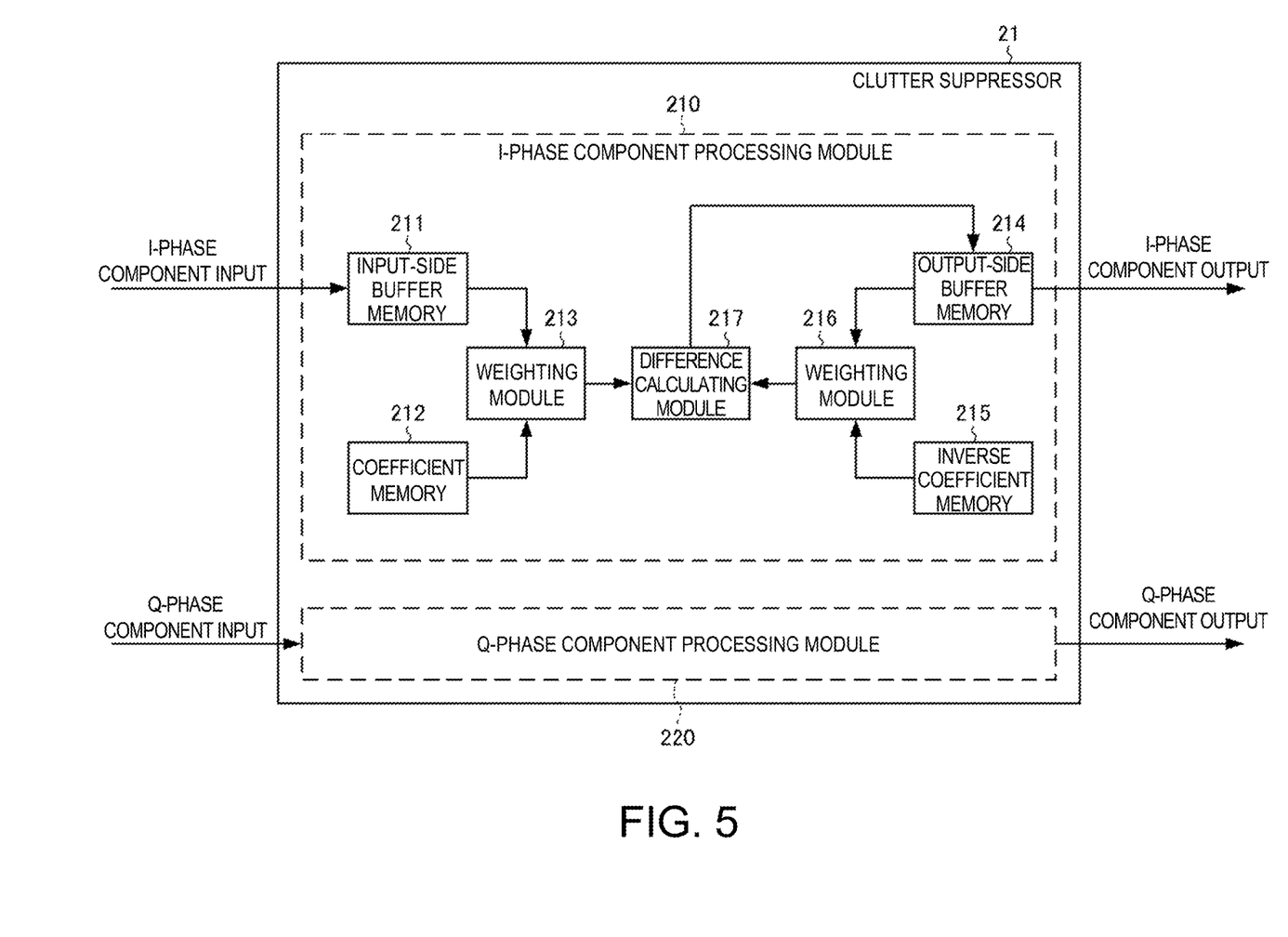
FIG. 5 is a block diagram of the clutter suppressor provided to the radar apparatus of the embodiment according to this disclosure.

As illustrated in FIG. 5, the clutter suppressor 21 includes an I-phase component processing module 210 and a Q-phase component processing module 220 which operate in real time. The modules 210 and 220 have a similar configuration except that their input and output signals are different. Therefore, in the following description, the I-phase component processing module 210 is described while the description of the Q-phase component processing module 220 is omitted. Note that, the I- and Q-phase component processing modules 210 and 220 may comprehensively be referred to as a filter.

The I-phase component processing module 210 includes, on its input side for data, an input-side buffer memory 211, a coefficient memory 212, and a weighting module 213. Further, the I-phase component processing module 210 includes, on its output side for data, an output-side buffer memory 214, an inverse coefficient memory 215, and a weighting module 216. Moreover, the I-phase component processing module 210 includes a difference calculating module 217 connected with the weighting modules 213 and 216.

The input-side buffer memory 211 sequentially receives I-phase components of the echo data for the plurality of sweeps, and temporarily stores each received echo data in association with sweep direction (azimuth direction) and distance in real time. In this embodiment, the input-side buffer memory 211 can store echo data for six sweeps in real time. Note that, the input-side buffer memory 211 may be referred to as the echo data memory.

The coefficient memory 212 stores predetermined coefficients. In this embodiment, the coefficient memory 212 stores six coefficients.

The weighting module 213 weights the echo data for each sweep by multiplying, with each coefficient stored in the coefficient memory 212, each data of the data row in the azimuth direction for the predetermined distance selected from the echo data for each of the plurality of sweeps temporarily stored in the input-side buffer memory 211, and the weighting module 213 outputs the result to the difference calculating module 217. The weighting module 213 may be referred to as the first weighting module.

The output-side buffer memory 214 sequentially receives suppression echo data (described later) obtained by the difference calculating module 217, and temporarily stores each received suppression echo data in association with sweep direction (azimuth direction) and distance in real time. In this embodiment, the output-side buffer memory 214 can store six suppression echo data in real time. Note that, the output-side buffer memory 214 may be referred to as the suppression echo data output unit and the suppression echo data memory.

The inverse coefficient memory 215 stores predetermined inverse coefficients. In this embodiment, the inverse coefficient memory 215 stores six inverse coefficients.

The weighting module 216 weights the echo data for each sweep by multiplying, with each inverse coefficient stored in the inverse coefficient memory 215, each data of the data row in the azimuth direction for the predetermined distance selected from the suppression echo data for each of the plurality of sweeps temporarily stored in the output-side buffer memory 214, and the weighting module 216 outputs the result to the difference calculating module 217. The weighting module 216 may be referred to as the second weighting module.

The difference calculating module 217 obtains echo data indicating a difference between the echo data weighted by the weighting modules 213 and 216 (suppression echo data), and outputs it to the output-side buffer memory 214.

Next, operation of the clutter suppressor 21 of this embodiment is described in detail with reference to FIG. 6.

Figure 6:
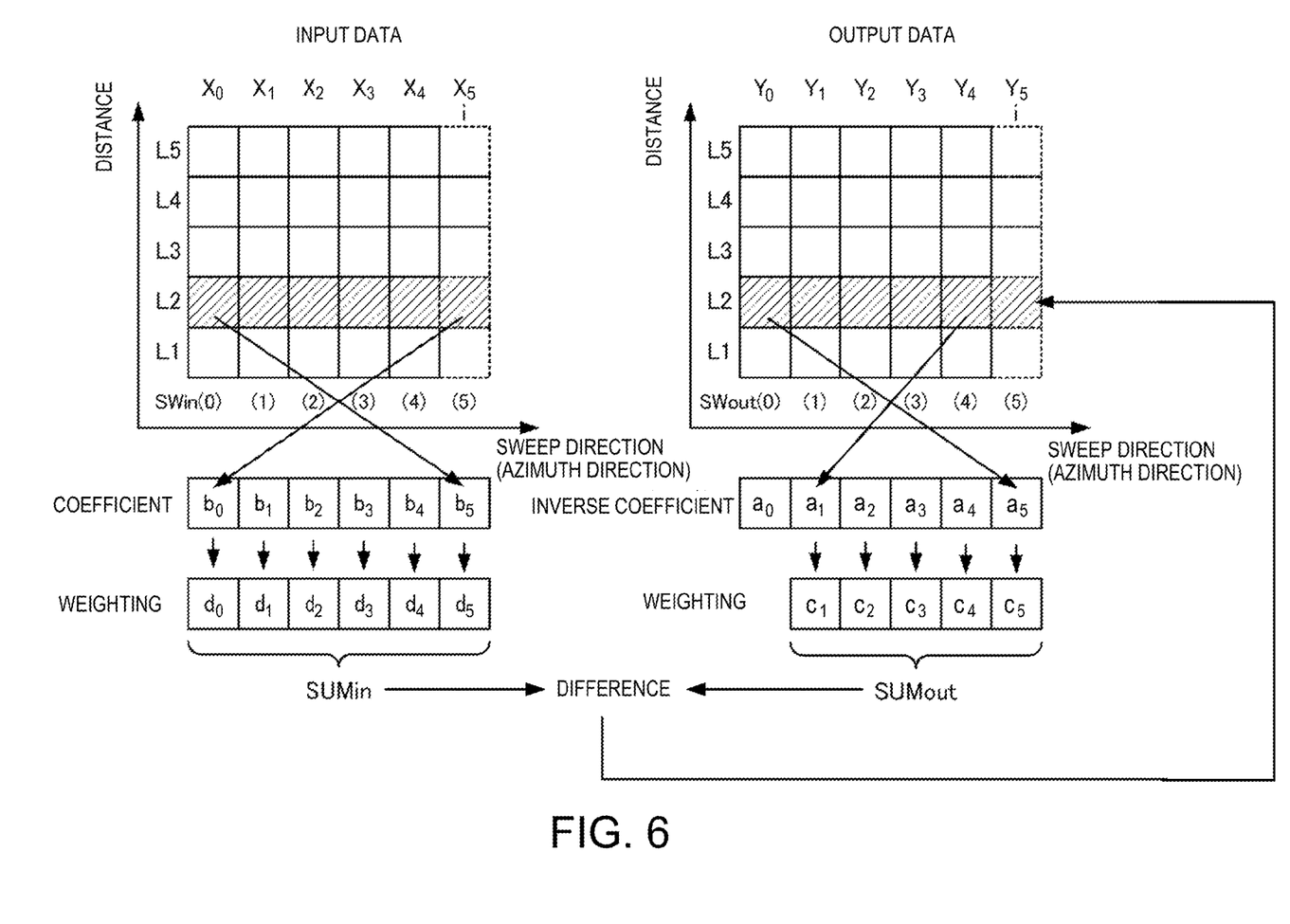
FIG. 6 is a view for describing operation of the clutter suppressor provided to the radar apparatus of the embodiment according to this disclosure.

FIG. 6 is a view for describing a process of obtaining filtered output data $Y_5$ when $N_a=N_b=6$ in Equation 1. In FIG. 6, to simplify the description, the number of the plurality of echo data aligned in the distance direction (time axis) is five, and the distances of the plurality of echo data are L1 to L5, respectively. When $a_0=1$ in Equation 1, the output data $Y_5$ is obtained based on Equation 2.

$$Y_5 = \sum_{j=0}^{5} b_j X_{5-j} - \sum_{k=1}^{5} a_k Y_{5-k} \qquad (2)$$

As illustrated in the upper left part of FIG. 6, the input-side buffer memory 211 sequentially receives the echo data for the respective sweeps and temporarily stores each received echo data in association with sweep direction (azimuth direction) and distance in real time. Here, when the echo data for an i-th sweep (i=0, 1, 2 . . . ) is indicated as SWin(i), the upper left part of FIG. 6 indicates a state where i=5, and SWin(5) is inputted into the input-side buffer memory 211 after SWin(0) to SWin(4) are sequentially buffered in real time.

On the other hand, the coefficient memory 212 stores six coefficients $b_0$ to $b_5$ as illustrated in FIG. 6.

When SWin(5) is inputted into the input-side buffer memory 211, the weighting module 213 multiplies data of the data row in the azimuth direction for the predetermined distance (L1 to L5) selected from SWin(0) to SWin(5) by the respective coefficients $b_0$ to $b_5$, and obtains a sum value SUMin (first sum value) on the input side by adding the respective products.

Specifically, for example at the distance L2, the weighting module 213 obtains a product $d_5$ between the data $X_0$ of SWin(0) and the coefficient $b_5$, a product $d_4$ between the data $X_1$ of SWin(1) and the coefficient $b_4$, . . . , and a product $d_0$ between the data $X_5$ of SWin(5) and the coefficient $b_0$. Then, the weighting module 213 obtains a sum value SUMin of the products $d_0$ to $d_5$ at the distance L2, and outputs the obtained sum value SUMin to the difference calculating module 217.

The difference calculating module 217 obtains a difference between the sum value SUMin obtained by the weighting module 213 and a later-described sum value SUMout on the output side (second sum value), and successively updates the data in the output-side buffer memory 214 by outputting the obtained difference as SWout(i) to the output-side buffer memory 214. The output-side buffer memory 214 successively updates the output data for each sweep by sequentially outputting SWout(i). As a result, the clutter suppressor 21 outputs in real time the suppression echo data suppressed only in the static clutter components.

Next, as illustrated in the upper right part of FIG. 6, the output-side buffer memory 214 sequentially receives SWout(i) which is the i-th suppression echo data from the difference calculating module 217, and temporarily stores each received suppression echo data in association with sweep direction (azimuth direction) and distance in real time. The upper right part of FIG. 6 indicates a state where SWout(5) is inputted into the output-side buffer memory 214 after SWout(0) to SWout(4) are sequentially buffered in real time.

On the other hand, the inverse coefficient memory 215 stores six inverse coefficients $a_0$ to $a_5$ as illustrated in FIG. 6.

When SWout(5) is inputted into the output-side buffer memory 214, the weighting module 216 multiplies each data of the data row in the azimuth direction for the predetermined distance selected from SWout(0) to SWout(4) by the inverse coefficients $a_1$ to $a_5$, and obtains the sum value SUMout on the output side by adding the respective products.

Specifically, for example at the distance L2, the weighting module 216 obtains a product $c_5$ between the data $Y_0$ of SWout(0) and the inverse coefficient as, a product $c_4$ between the data $Y_1$ of SWout(1) and the inverse coefficient $a_4$, . . . , and a product $c_1$ between the data $Y_4$ of SWout(4) and the inverse coefficient $a_1$. Then, the weighting module 216 obtains a sum value SUMout of the products $c_1$ to $c_5$ at the distance L2.

Note that, although the above description is given only regarding the distance L2, the weighting modules 213 and 216 similarly obtain sum values SUMin and SUMout in terms of the other distances L1 and L3 to L5, respectively.

Further, when SWin(6) is inputted successively to SWin(5), the input-side buffer memory 211 shifts SWin(1) to SWin(5) to the current memory locations for SWin(0) to SWin(4) to overwrite, and stores SWin(6) at the current memory location for SWin(5). Similarly, the shifting and overwriting of the data are also performed at the output-side buffer memory 214 and newly-obtained SWout(6) is stored at the current memory location for SWout(5). Hereinafter, every time the data is inputted, the input- and output-side buffer memories 211 and 214 similarly repeat the shifting and overwriting of the data.

Moreover, in FIG. 6, although the state where the input- and output-side buffer memories 211 and 214 are full is given as an example, the data outputted from the output-side buffer memory 214 in a period from the buffer memories starting to buffer until the buffer memories becomes full is preferably considered as data in a transient response period and discarded.

Moreover, in the above description, the example in which the clutter components are suppressed in real time by weighting each data of the data row in the azimuth direction for the predetermined distance selected from the inputted echo data is given; however, instead of processing in real time, for example, all echo data of the entire area of the observation target may be obtained before select, from all the echo data, a data row in the azimuth direction for the predetermined distance and weighting each data of the data row.

By the above operation, based on the filter characteristic illustrated in FIG. 4B, the clutter suppressor 21 can suppress only the static clutter components which are the echo components of land, a building, etc., without suppressing the echo components of cloud or rain which moves comparatively slow (e.g., 5 or 10 knots).

As above, with the meteorological radar 10 of this embodiment, since the reference data removing module 24 removes the reference data obtained in fine weather and generated by suppressing the static clutter components, from the data obtained in rainy weather and in which the static clutter components are suppressed, the static clutter components can suitably be suppressed.

Note that, as the clutter suppressor to suppress the static clutter components, it preferably has the filter characteristic with sharp inclination as the clutter suppressor 21; however, without limiting to this, the conventional MTI processing device 1 (see FIGS. 3A and 3B) may be used for example.

Moreover, in the above embodiment, the example in which the clutter suppressing device according to this disclosure is applied to the meteorological radar is given; however, without limiting to this, this disclosure may also be applied to any radar other than the meteorological radar, and similar effects can be obtained.

As described above, the clutter suppressing device and the radar apparatus provided with the clutter suppressing device according to this disclosure exert the effect of suitably suppressing the static clutter components, and are useful as a clutter suppressing device configured to suppress a static clutter components contained in a reception signal of a meteorological radar, etc., and a radar apparatus provided with the clutter suppressing device.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A clutter suppressing device for suppressing echo data of static clutter components indicating reflection waves caused by radar transmission signals reflecting on a static object, each of the radar transmission signals transmitted at a predetermined azimuth at a predetermined time interval from a radar antenna provided at a predetermined observation location to observe meteorological weather, the clutter suppressing device comprising:
a static clutter component suppressor configured to receive reception signals containing the static clutter components, and suppress the static clutter components;
a reference data memory configured to store, as reference data, echo data of the reception signals obtained in fine weather and in which the static clutter components are suppressed by the static clutter component suppressor; and
a rain component extracting module configured to extract echo data indicating rain components contained in the reception signals, by removing the reference data stored in the reference data memory from echo data of the reception signals obtained in rainy weather and in which the static clutter components are suppressed by the static clutter component suppressor;
wherein the static clutter component suppressor includes:
an echo data memory configured to sequentially store a plurality of echo data of reflection waves caused by the radar transmission signals reflecting on objects;
a filter configured to select, from the plurality of echo data stored in the echo data memory, a data row in the azimuth direction for a predetermined distance, and suppress, in the data row, echo data of a target object moving at a speed within a predetermined range including zero speed; and
a suppression echo data output unit configured to output suppression echo data containing the echo data suppressed by the filter.

2. The clutter suppressing device of claim 1, wherein the static clutter component suppressor includes:
a suppression echo data memory configured to store the suppression echo data outputted from the suppression echo data output unit;
a first weighting module configured to weight each data of the data row in the azimuth direction for the predetermined distance selected from the plurality of echo data stored in the echo data memory, and obtain a first sum value of the weighted data;
a second weighting module configured to select, from the suppression echo data stored in the suppression echo data memory, a data row in the azimuth direction for the predetermined distance, weight each data of the data row, and obtain a second sum value of the weighted data; and
a difference calculating module configured to obtain a difference between the first and second sum values, and cause the suppression echo data output unit to output the difference as the suppression echo data.

3. The clutter suppressing device of claim 2, wherein the reception signals received by the static clutter component suppressor are signals containing the reflection waves from which interference components are removed.

4. A radar apparatus, comprising:
a clutter suppressing device for suppressing echo data of static clutter components indicating reflection waves caused by radar transmission signals reflecting on a static object, each of the radar transmission signals transmitted at a predetermined azimuth at a predetermined time interval from a radar antenna provided at a predetermined observation location to observe meteorological weather, the clutter suppressing device comprising:
a static clutter component suppressor configured to receive reception signals containing the static clutter components and the reflection waves from which interference components are removed, and suppress the static clutter components;
a reference data memory configured to store, as reference data, echo data of the reception signals obtained in fine weather and in which the static clutter components are suppressed by the static clutter component suppressor;

a rain component extracting module configured to extract echo data indicating rain components contained in the reception signals, by removing the reference data stored in the reference data memory from echo data of the reception signals obtained in rainy weather and in which the static clutter components are suppressed by the static clutter component suppressor;

a radar antenna configured to transmit each of the radar transmission signals at a predetermined azimuth from the radar antenna at a predetermined time interval;

a transmitter configured to output the radar transmission signal to the radar antenna; and a receiver configured to receive a plurality of echo data of the reflection waves caused by the radar transmission signals reflecting on objects;

wherein the static clutter component suppressor includes:

an echo data memory configured to sequentially store the plurality of echo data of reflection waves caused by the radar transmission signals reflecting on the objects;

a filter configured to select, from the plurality of echo data stored in the echo data memory, a data row in the azimuth direction for a predetermined distance, and suppress, in the data row, echo data of a target object moving at a speed within a predetermined range including zero speed;

a suppression echo data output unit configured to output suppression echo data containing the echo data suppressed by the filter;

a suppression echo data memory configured to store the suppression echo data outputted from the suppression echo data output unit;

a first weighting module configured to weight each data of the data row in the azimuth direction for the predetermined distance selected from the plurality of echo data stored in the echo data memory, and obtain a first sum value of the weighted data;

a second weighting module configured to select, from the suppression echo data stored in the suppression echo data memory, a data row in the azimuth direction for the predetermined distance, weight each data of the data row, and obtain a second sum value of the weighted data; and a difference calculating module configured to obtain a difference between the first and second sum values, and cause the suppression echo data output unit to output the difference as the suppression echo data.

\* \* \* \* \*